United States Patent [19]

Carey

[11] 4,235,405
[45] Nov. 25, 1980

[54] SUPPORT APPARATUS FOR A CAMERA

[75] Inventor: Alexander Carey, Gaithersburg, Md.

[73] Assignee: ENG Helicopter Satellites, Ltd., Gaithersburg, Md.

[21] Appl. No.: 23,218

[22] Filed: Mar. 23, 1979

[51] Int. Cl.³ .......................................... F16M 13/00
[52] U.S. Cl. ................................. 248/123.1; 343/882
[58] Field of Search ...................... 343/880, 881, 882; 248/123.1, 178

[56] References Cited

U.S. PATENT DOCUMENTS

| | | | |
|---|---|---|---|
| 3,510,877 | 5/1970 | Turriere | 343/882 |
| 3,624,662 | 11/1971 | Feder | 343/882 |

*Primary Examiner*—Eli Lieberman
*Attorney, Agent, or Firm*—Pollock, Vande Sande & Priddy

[57] ABSTRACT

An apparatus for supporting a camera and moving the camera in a plurality of scanning directions. A support sleeve is detachably affixed to a support surface and is telescopically engaged with a support shaft that rotates within the support sleeve and slides upwardly and downwardly with respect to the support sleeve. A compression spring is provided to resiliently support the support shaft within the support sleeve to absorb vertical vibrations. An extending arm having a rear shaft portion and a front arm portion is supported in a bearing block for axial rotation of the rear shaft portion. The bearing block is affixed to the top end of the support shaft so that the block rotates with the shaft to impart a swinging motion to the extending arm. A tilting shaft is vertically aligned with respect to the support shaft and is connected for adjustable rotation at the end of the front arm portion of the extending arm. A camera is detachably mounted at the bottom end of the tilting shaft. A counter-balance spring is disposed within the support shaft and associated tension adjust apparatus is affixed to the end of the rear shaft portion of the extending arm to adjust the tension of the counter-balance spring and to thereby apply an adjustable downward force to the end of the rear shaft portion of the extending arm to counter-balance the weight of the attached camera.

8 Claims, 10 Drawing Figures

SUPPORT APPARATUS FOR A CAMERA

DESCRIPTION

1. Technical Field

The invention relates to an improved camera mount, and, more particularly, to such a mount for supporting a camera in an airborne vehicle, for example a helicoptor, and allowing the camera to be easily moved in a plurality of scanning directions.

2. Background Art

It is known in the art to support a television camera within an airborne vehicle such as a helicoptor, so that the relatively bulky television camera may be moved in many directions by a camera operator to scan the ground below and the space around the helicoptor. Similar supports are also employed for operating movie cameras in airborne vehicles.

For example, in the patent to Masseron, U.S. Pat. No. 3,788,585, there is disclosed a support apparatus for a newsreel camera or television camera that may be employed to scan the camera in several directions. Tyler camera mounts have also been used to support and operate television cameras and movie cameras in airborne vehicles.

Many prior art camera supports tend to be bulky and, therefore, are not well suited for operation in a small area, such as the cockpit of a helicoptor, particularly when additional equipment, for example microwave or other communications equipment must also be placed within the helicoptor. Also, due to the reduced space in a helicoptor, it is often necessary for a single camera operator to operate the supported camera and related communications equipment. Thus, it is particularly important that a support apparatus readily allow a camera operator to operate a camera by hand, without requiring unusual or unnecessary effort.

When operating in an airborne vehicle, a camera mount must also provide a means for damping the vibrations that are transmitted from the body of the helicoptor to the camera mount. Also, for added flexibility of operation, it is desirable for a camera mount to include means for maintaining the camera in a fixed viewing position and for adjustably counter-balancing the weight of the camera to allow for easy camera movement.

Accordingly, it is an object of the invention to provide a compact and relatively simple camera support apparatus for easily manipulating a camera in a variety of directions, particularly when the camera is enclosed within a small space.

A further object of the invention is to provide such a camera support apparatus that includes means for damping the vertical vibrations that are transmitted from a camera support vehicle, for example a helicoptor.

Another object of the invention is to provide a camera mount that may be easily and quickly mounted and dismounted from a helicoptor.

A further object of the invention is to provide a camera mount that may be used to support a television camera in a camera system employing a microwave antenna for communication with a ground station.

Another object of the invention is to provide a camera mount having means for adjustably counterbalancing the weight of a supported camera.

These and other objects of this invention will become apparent from a review of the detailed specification which follows and a consideration of the accompanying drawings.

DISCLOSURE OF INVENTION

In order to achieve the objects of the invention and to overcome the problems of the prior art, the improved camera support apparatus, according to the invention, includes a support sleeve that may be detachably affixed to a support surface, for example a reinforced aluminum platform. A tubular shaft is telescopically engaged with the support sleeve to rotate within the sleeve and to slide up and down within the sleeve. The tubular shaft is resiliently supported in the support sleeve by a compression spring that absorbs the vibrations that are transmitted from the platform to the support sleeve.

An extending arm having a rear shaft portion and a front arm portion is supported in a bearing block for axial rotation of the rear shaft portion. The bearing block is pivotally connected to the top end of the tubular shaft and rotates with the shaft to swing the extending arm.

A tilting shaft is vertically aligned with respect to the tubular shaft and has a horizontal shaft portion at its top end that is connected for adjustable rotation at the end of the front arm portion of the extending arm. The bottom end of the tilting shaft is attached to a support block that is employed to detachably support a camera, for example a TV camera or a movie camera.

A counter-balance spring is disposed within the tubular shaft and is connected at one end to the tubular shaft and at the other end to a cable that passes over pulleys and that is affixed to the end of a threaded rod.

The threaded rod is supported by a tension adjust bracket having a sleeve portion that rotatably engages the rear shaft portion of the extending arm. A tension adjust knob engages a top portion of the threaded rod and may be rotated to adjust the vertical position of the rod.

Rotation of the tension adjust knob and the associated movement of the threaded rod causes an adjustable downward force to be applied to the rear shaft portion of the extending arm so that the weight of the attached camera may be counter-balanced.

A circumferentially extending slot is formed in the sleeve portion of the tension adjust bracket and the slot is engaged by a pin that is formed in the rear shaft portion of the extending arm. The shaft and pin operate to allow the rear shaft portion of the extending arm to rotate an angular distance while the sleeve portion of the tension adjust bracket remains stationary.

Friction knobs are provided to control the axial movement of the rear shaft portion of the extending arm and the tilting movement of the tilting shaft.

The support sleeve is detachably supported by a flange that is bolted to a support platform and the flange and support sleeve are connected by a quick release pin. A ring clamp is engaged with the support sleeve and an extending arm of the ring clamp is attached to a bracket on a bulkhead or wall by means of a quick release pin.

A microwave antenna may be attached to the support platform of the camera mount by employing a support bracket that uses a clamp to grip a shaft of the antenna when the antenna is in an extended operational position.

BEST MODE FOR CARRYING OUT THE INVENTION

Figure 6A:
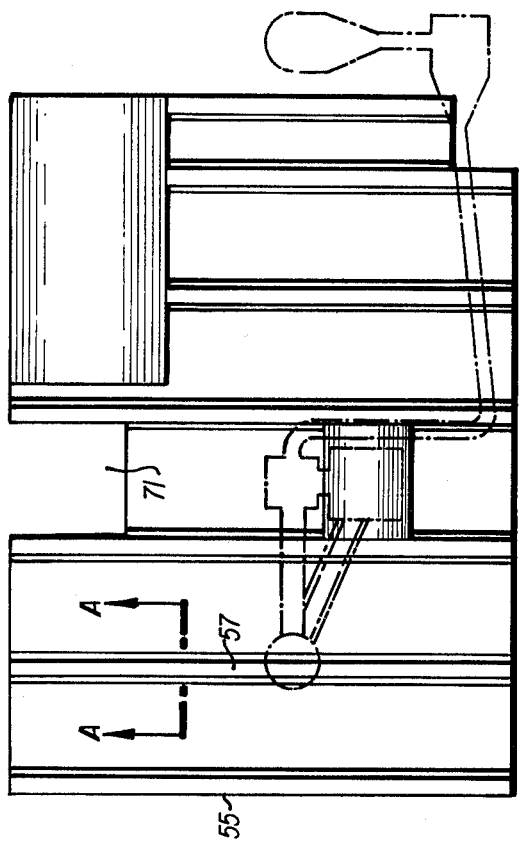
FIG. 6A illustrates a platform for supporting the camera mount apparatus of FIG. 1 in a helicoptor.

The remaining portion of this specification will describe preferred embodiments of the invention when read in conjunction with the attached drawings, in which like reference characters identify identical apparatus.

Figure 1:
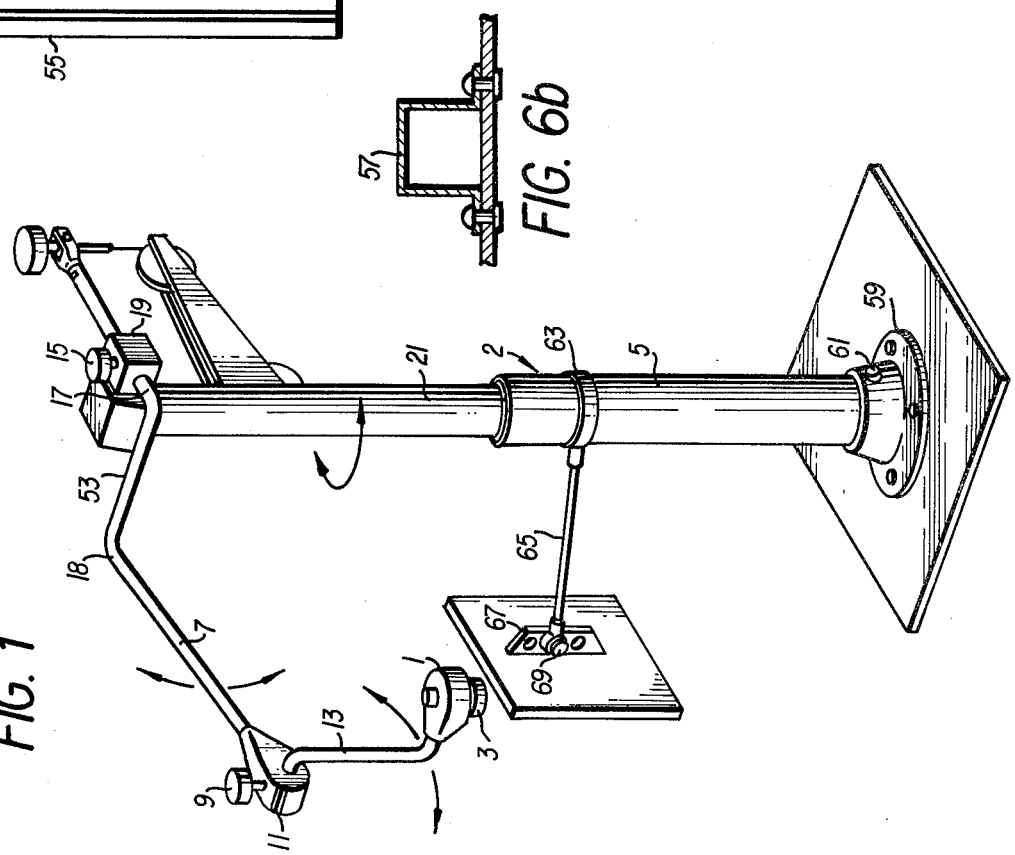
FIG. 1 shows a perspective view of a camera support apparatus according to the invention.

FIG. 1 illustrates a perspective view of a camera mount that may be used to support a camera, for example a television camera, for operation in an airborne vehicle such as a helicoptor. In accordance with the invention, a television camera is attached to the top surface of a camera support block 1 by means of a support screw 3.

As shown in FIG. 1, the camera support block 1 and attached camera (not shown) may be moved in many directions in accordance with the invention. For example, the camera support block 1 and the associated attached camera may be tilted up or down by loosening a friction knob 9 in a bearing block 11 to allow a horizontally extending portion of a tilting shaft 13 to rotate in the bearing block 11. The camera support block 1 and associated camera may be rotated an angular distance in a clockwise or counterclockwise direction by loosening a friction knob 15 to allow a rear shaft portion 17 of an extending arm 18 to rotate in a bearing block 19 that is pivotally connected to the top of a main support shaft 21. The camera support block 1 may be moved to the right or left by swinging the camera in the appropriate direction to cause a main support shaft 21 to rotate in a main camera support sleeve 5. The camera may be pivoted upwardly or downwardly at the pivotal connection of the bearing block 19 and the top of the support shaft 21 and the pivotal connection may also be employed to counter-balance the camera.

Figure 2:
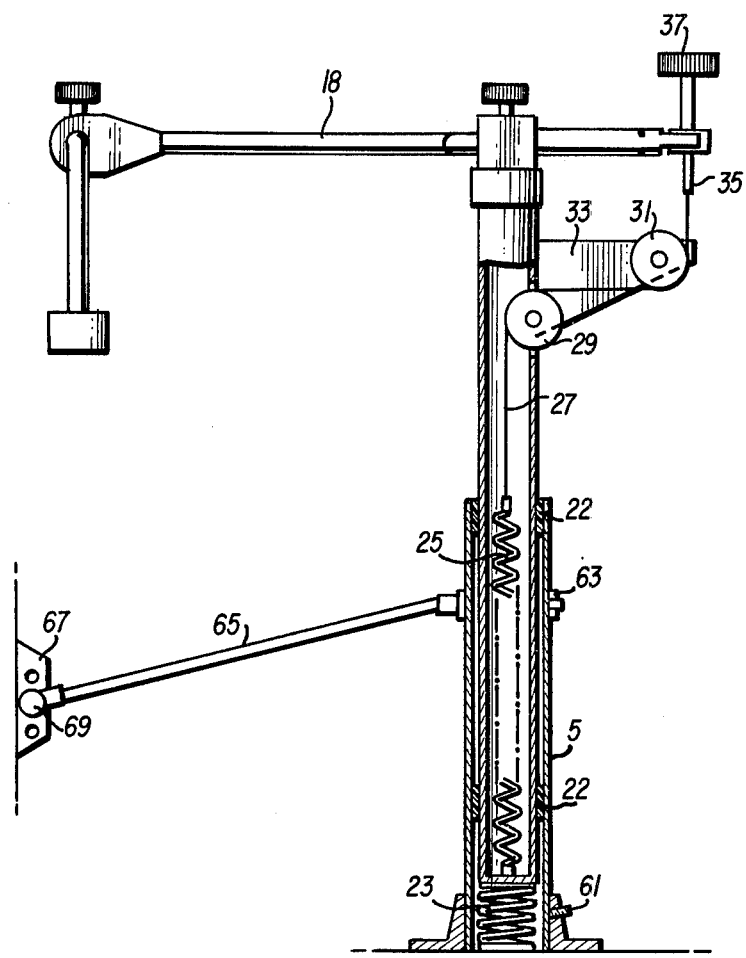
FIG. 2 shows a front elevation view in partial section of the support apparatus of FIG. 1.

The operation of the camera support apparatus may be better understood with reference to FIG. 2, which shows a front elevation view of the camera support in partial section. As shown in FIG. 2, a compression spring 23 is positioned within the main camera support sleeve 5 and is attached to contact the bottom end of the support shaft 21, thereby resiliently supporting the support shaft 21 and serving to cushion the shaft from vibrations that would otherwise be transmitted to the camera.

As shown in FIG. 2, the main support shaft 21 is a hollow tube mounted for rotation and sliding in the support sleeve 5 on bushings, for example teflon bushings 22. A counter-balance spring 25 is disposed within the shaft 21 and is affixed at one end to the bottom portion of the shaft. The counter-balance spring 25 is attached at its other end to a cable 27 that passes over a first pulley 29 to a second pulley 31 that is rotatably supported by a support bracket 33.

The top end of the cable is affixed to an end of a threaded rod 35 and the spring tension on the cable 27 is adjusted by turning a tension adjust knob 37 to raise or lower the threaded rod 35. Thus, if the rod 35 is raised, the spring tension on the cable 27 is increased and a corresponding increased downward pulling force is applied to the end of the extending arm 18 to apply a pivoting movement to the arm 18 about the pivotal connection of the bearing block 19, and to thereby counter-balance the weight of the camera. Likewise, if the threaded rod 35 is lowered, the tension on the cable 27 is decreased since the counter-balance spring 25 will pull less forcefully on the cable 27.

It should be appreciated that the weight of the camera is counter-balanced by the operation of the counter-balance spring 25 and the associated tension adjust knob 37. Thus, after the camera is attached to the camera support block 1, the tension adjust knob 37 may be rotated to define a particular cable tension that counter-balances the weight of the camera and thereby allows the camera support to operate smoothly and with a minimal amount of physical effort by the camera operator.

Figure 3:
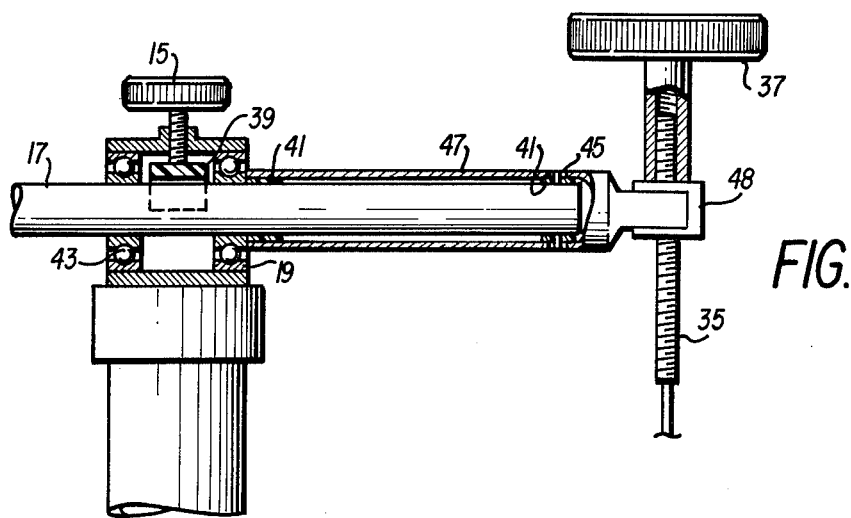
FIG. 3 shows a front elevation view in partial section of the top portion of the support shaft and the rear shaft portion of the extending arm of the apparatus of FIG. 1.

FIG. 3 illustrates a front elevation view in partial section of the top portion of the support apparatus of the invention. More particularly, FIG. 3 illustrates the apparatus that is used to rotate the rear shaft portion 17 in the bearing block 19. As shown in FIG. 3, the rear shaft 17 may be held in position by tightening the friction knob 15 to cause an associated friction bearing 39 to press against the shaft 17. Of course, if it is desired to rotate the shaft 17, the friction knob 15 is loosened and the bearing 39 is thereby caused to release the shaft 17. It should be understood that when the friction knob 15 is loosened, the shaft 17 is allowed to rotate on cylindrical bearings 41 and associated ball bearings 43.

When the rear shaft 17 is rotated, the threaded rod 35 and associated tension adjust knob 37 remain in a vertically upright position in order to maintain the cable 27 in operative contact with the pulleys 29 and 31. More particularly, a sleeve portion 47 of a bracket 48 is positioned over the rear shaft 17 and the threaded rod 35 and associated tension adjust knob 37 are rotatably supported by the bracket 48. A pin and slot coupling is provided between the sleeve 47 and the rear shaft 17 to allow the shaft 17 to rotate a small angular distance without interferring with the upright positioning of the threaded rod 35.

Figure 5:
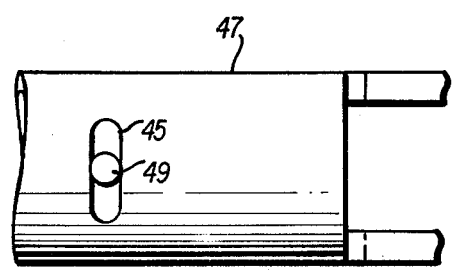
FIG. 5 shows a top elevation view of the pin and slot connection between a tension adjust sleeve and a rear shaft portion of the extending arm of FIG. 1.

More particularly, as shown in FIG. 5, a slot 45 is provided at the end portion of the sleeve 47 and a corresponding pin 49 of the shaft 17 is engaged in sliding relation with the slot 45. As the rear shaft 17 is rotated, the pin 49 moves in the slot 45 so that the sleeve 47 remains stationary and the threaded rod and associated tension adjust knob are maintained in an upright position.

Figure 4:
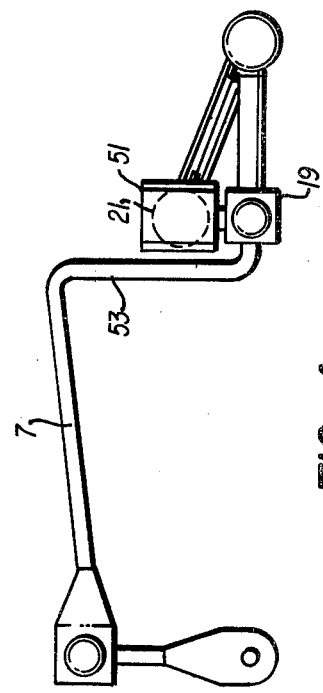
FIG. 4 shows a top elevation view of the apparatus of FIG. 1.

FIG. 4 illustrates a top elevation view of the camera support apparatus of a preferred embodiment of the invention. As shown in FIG. 4, the main support shaft 21 is rigidly affixed to a corresponding support block 51 that is pivotally connected to the bearing block 19. Thus, the bearing block 19 and associated camera support block 1 will rotate with the shaft 21 and will pivot upwardly or downwardly.

It should be understood that the camera support apparatus may be mounted in a helicopter so that the camera extends through an opening in a bulkhead, for example a rear door of the helicopter. The camera operator sits in front of the main camera support shaft 21 and faces out through the rear door opening to direct the movements of the camera. When the camera operator is in position, a front arm portion 7 of the extending arm 18 of the camera support 2 extends over the operator's shoulder so that the attached camera is in position directly in front of the operator.

The front arm portion 7 may form an angle of less than 90°, for example 80°, with a corresponding arm portion 53 in order to centrally position the camera support block and associated attached camera with respect to the body of the camera operator. Thus, although the reduced angle is not of critical importance, it does serve to provide for a comfortable positioning of the camera and the viewfinder of the camera for the camera operator.

Figure 6B:
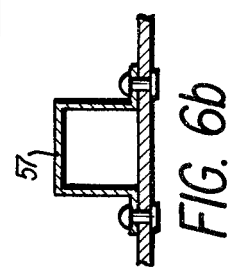
FIG. 6B shows a cross-sectional view of the reinforcement ribs of the support platform of FIG. 6A, taken along a line A—A in the direction of the arrows.

FIG. 6a illustrates a top elevation view of a support platform 55 that is used to mount the camera support apparatus 2 in a helicopter, for example a Bell Jet Ranger or a Hughes 500. The support platform may be made of a light material such as aluminum and is easily installed on the deck of the rear cabin compartment of the helicopter, for example by bolting the platform to the deck. The support platform 55 includes reinforcing ribs 57, as shown in more detail in the cross-sectional view of FIG. 6b, taken on the line A—A of FIG. 6a in the direction of the arrows.

The camera mount apparatus is supported on the support platform 55 by a flange 59 that may be bolted to the platform, as shown in FIG. 2. The main camera support sleeve 5 is secured to the flange 59 by means of a quick release pin 61 that may be easily engaged or disengaged to allow the camera support apparatus 2 to be connected or disconnected from the support platform 55. Lateral support for the main camera support sleeve 5 is provided by a clamp 63 and associated extending rod 65 that is affixed to a seat bracket 67 by means of a quick release pin 69. The seat bracket 67 is affixed to a bulkhead of the helicopter. Thus, the quick release pins 61 and 69 may be utilized to quickly install or to remove the camera support from the support platform 55.

The support platform 55 of FIG. 6a was designed for use with a Bell Jet Ranger or Hughes 500 helicopter and for this reason a cut-out portion 71 is provided to accomodate the structural features of these helicopters. However, it should be appreciated that the platform 55 may be shaped to support the camera mount apparatus 2 in any aircraft or other vehicle or structure that requires a movable camera mount. Also, it should be appreciated that although the operation of the camera mount of the invention has been described with respect to a helicopter and a TV camera, the camera mount may be used to support other types of cameras and may be operated in other structures without departing from the spirit of the invention.

Figure 7:
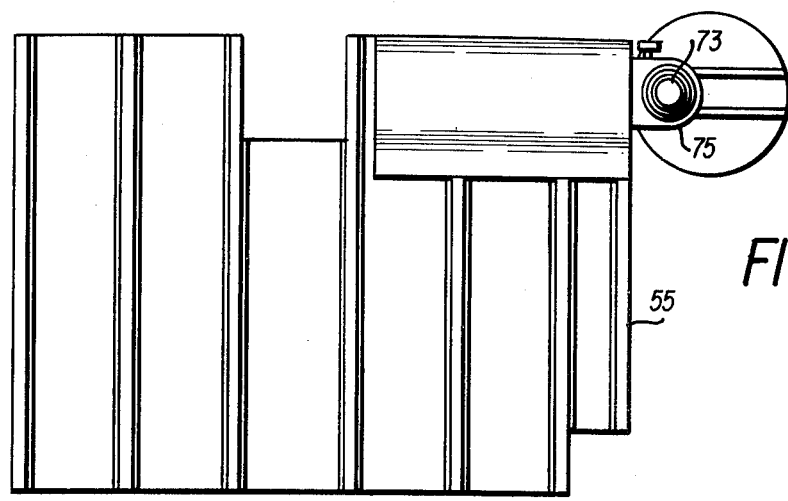
FIG. 7 shows a top elevation view of the support platform of FIG. 6A with a microwave antenna support bracket attached.
Figure 8:
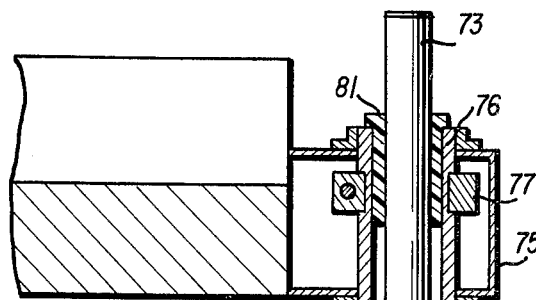
FIG. 8 shows a front elevation view in partial section of a microwave antenna and support bracket in accordance with the invention.
Figure 8:
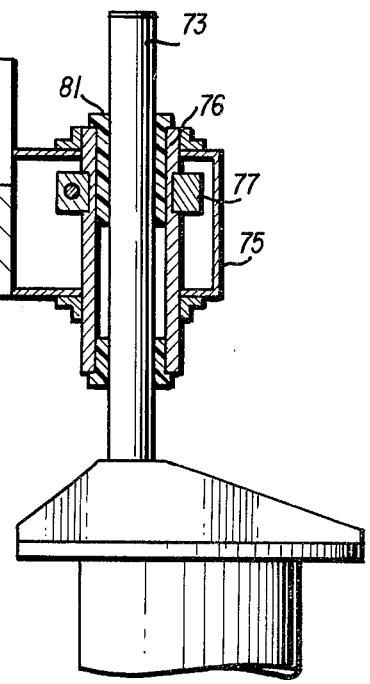

FIGS. 7 and 8 illustrate a microwave antenna mounting apparatus that may be affixed to the support platform 55 and utilized for supporting a microwave antenna to provide microwave communications in a system utilizing the camera mount apparatus of the invention to support a TV camera. As shown in FIGS. 7 and 8, a shaft 73 of a microwave antenna is clamped to an antenna support bracket 75 that is affixed to a corner of the support platform 55, so that the antenna may be extended through an opening in the helicopter.

Figure 9:
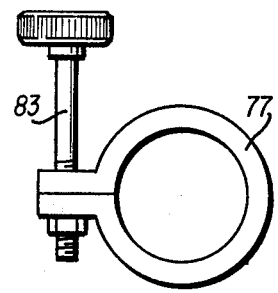
FIG. 9 shows a top elevation view of a ring clamp for maintaining the microwave antenna of FIG. 8 in position.

FIG. 9 illustrates a clamp 77 that is positioned as shown in FIG. 8 to hold the shaft 73 of the microwave antenna in a fixed position with respect to the antenna support bracket 75.

The antenna support bracket 75 includes an aluminum sleeve 76 that is undercut to allow the clamp 77 to be properly placed in position with respect to the antenna support bracket 75. An oilite bushing 81 is provided at the topmost portion of the antenna support bracket 75. The aluminum sleeve 76 and the bushing 81 are split so that the clamp 77 will apply a pressing force to the shaft 73 when the clamp adjustment screw 83 is tightened. Thus, the antenna may be extended outside the helicopter by loosening the clamp adjustment screw 83 and extending the shaft 73 an appropriate distance. Thereafter, the clamp adjustment screw 83 is tightened and the microwave antenna is thereby maintained in operative position with respect to the antenna support bracket 75.

It will be understood by those skilled in the art that the microwave antenna of FIGS. 7-9 may be used with the camera support apparatus of the invention to provide a communications link between the airborne camera operator and a ground installation.

It should also be understood that if such a microwave antenna and associated microwave transmission equipment or other communications equipment is utilized in a helicopter, the light weight and compact structure of the camera support apparatus of the invention is particularly important, due to the limited amount of available space in the cabin of the helicopter.

The invention may be embodied in other specific forms without departing from its spirit or essential characteristics. The present embodiments, are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. Apparatus for supporting a camera and scanning the camera in a plurality of directions, comprising:
   a support sleeve;
   a support shaft telescopically engaging said support sleeve for rotating about a support shaft axis and sliding axially with respect to the support sleeve;
   means for resiliently supporting said support shaft in said support sleeve;
   extending arm means having a rear shaft portion and a front arm portion, the rear shaft portion supported for axial rotation in a bearing block means, the bearing block means pivotally connected to a top end of said support shaft for rotation with the support shaft about the support shaft axis and for adjustable pivotal movement about a pivoting axis;
   tilting shaft means connected at one end to an extending end of said front arm portion for adjustable tilting rotation and having means at an opposite end for supporting a camera; and a counterbalance spring means disposed within said support shaft for applying a counter-balancing force to an extending end of said rear shaft portion to counter-balance the weight of said camera, one end of said counterbalance spring means connected to said support shaft and an opposite end of the counterbalance spring means connected to a tension adjust means mounted for partial rotation on said rear shaft portion, said tension adjust means including means for adjusting the magnitude of the counterbalancing force applied by said counterbalance spring means.

2. The apparatus of claim 1 including means for detachably affixing said support sleeve to a support surface.

3. The apparatus of claim 1 including a platform detachably mounted in a vehicle and means for detachably affixing said support sleeve to said platform for extending at least the front arm portion of the extending arm means outwardly through an opening in the vehicle.

4. The apparatus of claim 3 wherein said means for detachably affixing includes, a flange bolted to said platform, said flange detachably connected to the bottom end of said support sleeve, and a ring clamp affixed to an upper portion of said support sleeve, said ring clamp having an extending arm, the arm detachably connected to a wall bracket affixed to a wall of said vehicle.

5. The apparatus of claim 1 wherein the extending end of said front arm portion includes a bearing means for rotatably supporting said one end of the tilting shaft means, said bearing means including a friction knob means operable to engage said one end of the tilting shaft means for preventing the rotation of the tilting shaft means.

6. The apparatus of claim 1 wherein said tension adjust means includes:

bracket means having a sleeve portion for rotatably engaging said rear shaft portion, the sleeve portion of said bracket means having a circumferentially extending slot, pin means formed on said rear shaft portion and engaging said extending slot to allow said rear shaft portion to rotate while said sleeve portion remains stationary, threaded rod means rotatably mounted in said bracket means, tension adjust knob means engaging the top portion of said threaded rod means for rotating to adjust the vertical position of said threaded rod means, cable means affixed at one end to the bottom end of said threaded rod means and at the other end to said counter-balance spring means, and pulley means for rotatably supporting said cable means.

7. The apparatus of claim 1 wherein said means for resiliently supporting is a compression spring.

8. The apparatus of claim 1 wherein said bearing block means includes a friction bearing and a friction knob connected to said friction bearing, said friction knob operable to move said friction bearing into clamping engagement with said rear shaft portion to prevent the rear shaft portion from rotating.

* * * * *